United States Patent
Wang et al.

(10) Patent No.: US 11,104,612 B2
(45) Date of Patent: Aug. 31, 2021

(54) RAPID-HARDENING UNDERGROUND PIPELINE GROUTING REPAIR POLYMER AND PREPARING METHOD

(71) Applicant: Infrastructure Renewal Institute of Southern China, Guangdong (CN)

(72) Inventors: Fuming Wang, Guangdong (CN); Hongyuan Fang, Guangdong (CN); Lei Wang, Guangdong (CN); Peng Zhao, Guangdong (CN); Yanhui Pan, Guangdong (CN)

(73) Assignee: Infrastructure Renewal Institute of Southern China, Guangdong (CN)

( * ) Notice: Subject to any disclaimer, the term of this patent is extended or adjusted under 35 U.S.C. 154(b) by 75 days.

(21) Appl. No.: 16/416,199

(22) Filed: May 18, 2019

(65) Prior Publication Data
US 2019/0270672 A1 Sep. 5, 2019

(30) Foreign Application Priority Data

Jan. 4, 2019 (CN) .......................... 201910008825.0

(51) Int. Cl.
| | | |
|---|---|---|
| *C04B 26/16* | (2006.01) | |
| *C04B 22/16* | (2006.01) | |
| *C04B 24/26* | (2006.01) | |
| *C04B 103/14* | (2006.01) | |
| *C04B 103/40* | (2006.01) | |
| *C04B 111/00* | (2006.01) | |
| *C04B 111/70* | (2006.01) | |

(52) U.S. Cl.
CPC .............. *C04B 26/16* (2013.01); *C04B 22/16* (2013.01); *C04B 24/2664* (2013.01); *C04B 2103/14* (2013.01); *C04B 2103/40* (2013.01); *C04B 2111/00706* (2013.01); *C04B 2111/70* (2013.01)

(58) Field of Classification Search
CPC .................................................. C04B 26/16
See application file for complete search history.

(56) References Cited

U.S. PATENT DOCUMENTS

| | | | | | |
|---|---|---|---|---|---|
| 4,247,430 | A | * | 1/1981 | Constien ............ | C08G 59/4085 523/414 |
| 4,695,595 | A | * | 9/1987 | Blount ................ | C04B 28/26 521/114 |
| 5,005,646 | A | * | 4/1991 | Bloys .................. | C09K 8/46 106/719 |
| 2015/0087738 | A1 | * | 3/2015 | Wu ..................... | C08G 18/4825 521/174 |
| 2016/0280975 | A1 | * | 9/2016 | Cho ..................... | C09J 7/38 |
| 2017/0145297 | A1 | * | 5/2017 | Huang ................. | C09K 8/82 |
| 2018/0022987 | A1 | * | 1/2018 | Ortega Andrade ..... C04B 35/1115 507/269 |

FOREIGN PATENT DOCUMENTS

MY 142115 A * 9/2010

OTHER PUBLICATIONS

Cameo Chemicals Tris(2-Chloroethyl) Phosphate Datasheet. Evidentiary Reference. (Year: 2021).*
Espacenet Translation of CN 104231203 (Year: 2021).*
UL Prospector WSFR A300TB Datasheet. Evidentiary Reference. (Year: 2021).*
Wansheng WSFR A300TB Datasheet (Year: 2013).*

* cited by examiner

*Primary Examiner* — Michael M Dollinger

(57) ABSTRACT

The present invention provides a rapid-hardening underground pipeline grouting repair polymer and a preparing method thereof for underground pipes. The rapid-hardening underground pipeline grouting repair polymer comprises the base resin and the hardener, weight ratio of which is 2:1-1:1. The base resin comprises 50 to 160 parts by weight of an isocyanate; 20 to 100 parts of a chlorophosphate mixture with a density over 1400 kg/m$^3$; a parts by weight ratio of the isocyanate and chlorophosphate is 1:1-4:1. The hardener comprises 30 to 60 parts by weight of a chlorophosphate mixture with a density over 1400 kg/m$^3$, 5 to 15 parts of a propyl formate, a methyl propionate or a mixture of a propyl formate and a methyl propionate, 15 to 55 parts of a polyol, 1 to 3 parts of a surfactant, 2 to 6 parts of a catalyst, 0 to 0.5 parts of water and 0 to 1 parts of a colorant.

5 Claims, No Drawings

RAPID-HARDENING UNDERGROUND PIPELINE GROUTING REPAIR POLYMER AND PREPARING METHOD

CROSS REFERENCE OF RELATED APPLICATION

This application claims priority under 35 U.S.C. 119(a-d) to CN 201910008825.0, filed Jan. 4, 2019.

BACKGROUND OF THE PRESENT INVENTION

Field of Invention

The present invention relates to repairing the underground pipes, and more particularly to a rapid-hardening underground pipeline grouting repair polymer and the preparing method.

Description of Related Arts

The total length of underground pipe system for water supply, sewer, gas and heating amounts to 2,000,000 km in urban China. The safety problems such as pipe line burst, waste of water, road collapse or pollution due to leakage, subsidence or corrosion of the aged pipes are more and more frequently happened in recent years, which cause huge economic loss and social problems. The pipe line construction is an underground project and is difficult to check and repair. The conventional way of trenching for repair affects the traffic, wastes the resources and pollutes the environment.

Leakage is a common problem which is caused by corrosion of the concrete pipes or broken wires of PCCP (prestressed concrete cylinder pipe). The buildings and traffic are distributed intricately in urban area. The trenching for repair the pipe line is impossible. The conventional non-trenching way of repair the pipe line adopted by foreign countries replaces the whole pipe line system, which costs huge and is sensitive to environment. The present invention provides a rapid-hardening underground pipeline grouting repair polymer which is environment friendly, hardening accelerating and corrosion-proof. The present invention is able to seal the leakage rapidly, fill the void foundation and concrete the loose part.

The rapid-hardening underground pipeline grouting repair polymer for non-trenching repair of the pipe line especially for repairing the pipe burst and leakage meets the following requirements: 1. the grouting polymer is able to swell and obtains high strength after swelling, thus enables the water shutoff; 2. the grouting polymer is able to react with water and bind to the burst pipe leaking water and bind to the surface of the earth and rock; 3. the viscosity of grouting polymer is low enough to fit the grouting machine; 4. the grouting polymer hardens rapidly to reduce the impact of the steam; the pipe line is able to be used immediately; 5. the polymer is fire-resistant after molding; the fire-resistance rating is C. The Chinese patent CN104696664 B and CN 104652415 B provide technics and a method for repairing the pipe line with the polymer but does not disclose the composition and molding method of the polymer.

The conventional materials forms a mixture with water while being injected to the burst pipes through the high-pressure grouting machine, which causes the isocyanate functional groups which rich in the polymer to react with the water under the catalyst and release more carbon dioxide blowing agent. The volume of the polymer swells and the density of the polymer is low. The density is smaller than 25 $kg/m^3$. The small-density polymer floats on the surface of the water and is soft after consolidating, which has a compressive strength of less than 0.8 mpa.

The isocyanate in the conventional material reacts with the water and polyol in the conventional material, which releases large amounts of heat. The density of the polymer formed after consolidation is high. The consolidation process is rapid and the consolidation time is no more than 10 s. Large amount of materials are grouted to repair the pipes. The above listed processes cause the temperature within the material easily over 200° C. which causes core-yellowing of the polymer foam. The compressive strength of the core-yellowing polymer foam is much less than 0.8 mpa.

The conventional material is not fire resistant and easily burns.

The present invention provides a rapid-hardening underground pipeline grouting repair polymer and a preparing method thereof for underground pipes. The rapid-hardening underground pipeline grouting repair polymer comprises the base resin and the hardener, weight ratio of which is 2:1-1:1. The base resin comprises 50 to 160 parts by weight of an isocyanate; 20 to 100 parts of a chlorophosphate mixture with a density over 1400 $kg/m^3$; a parts by weight ratio of the isocyanate and chlorophosphate is 1:1-4:1. The hardener comprises 30 to 60 parts by weight of a chlorophosphate mixture with a density over 1400 $kg/m^3$, 5 to 15 parts of a propyl formate, a methyl propionate or a mixture of a propyl formate and a methyl propionate, 15 to 55 parts of a polyol, 1 to 3 parts of a surfactant, 2 to 6 parts of a catalyst, 0 to 0.5 parts of water and 0 to 1 parts of a colorant.

SUMMARY OF THE PRESENT INVENTION

The present invention provides a rapid-hardening underground pipeline grouting repair polymer and a preparing method thereof to solve the existing problems.

The rapid-hardening underground pipeline grouting repair polymer comprises a base resin and a hardener, the weight ratio of which is 2:1-1:1; wherein the base resin comprises 50 to 160 parts by weight of an isocyanate; 20 to 100 parts by weight of a chlorophosphate mixture with a density over 1400 $kg/m^3$; a parts by weight ratio of the isocyanate and chlorophosphate is 1:1-4:1;

the hardener comprises 30 to 60 parts by weight of a chlorophosphate mixture with a density over 1400 $kg/m^3$, 5 to 15 parts by weight of a propyl formate, a methyl propionate or a mixture of a propyl formate and a methyl propionate, 15 to 55 parts by weight of a polyol, 1 to 3 parts by weight of a surfactant, 2 to 6 parts by weight of a catalyst, 0 to 0.5 parts by weight of water and 0 to 1 parts by weight of a colorant.

The isocyanate is selected from the group consisting of a PAPI (polyaryl polymethylene isocyanates), a MDI(Methylenediphenyl Diisocyanate), a TDI (Toluene diisocyanate), a modified PAPI, a modified MDI and a modified TDI.

The polyol is selected from the group consisting of a sucrose polyether polyol, a sorbitol polyether polyol, a polyether polyol prepared by small molecular alcohol, an amine initiated polyether polyol, a phthalic anhydride based polyester polyol and an adipic acid polyether polyols.

The catalyst is selected from the group consisting of a catalyst PT303, a catalyst PT304 and a catalyst PT306.

The surfactant is an agent for stabilizing the foaming, realizing compact and uniform foam pore arrangement, unbroken foam pores. The surfactant is selected from the group consisting of a LK221, a LK443 or a LK665; wherein LK221 is a polyurethane cell stabilizer surfactant which is a liquid polymer-polyol product comprising the copolymer of N-vinyl pyrrolidone and dibutyl maleate polymerized in a trifunctional polyol; LK443 is a unique organic surfactant for use in rigid polyurethane applications to provide a smooth surface; LK665 is a non-silicone surfactant.

A method of preparing the rapid-hardening underground pipeline grouting repair polymer comprises steps of:
1) weighing materials for preparing the base resin and the hardener according to the parts of weight
2) adding the isocyanate and chlorophosphate for preparing the base resin into a reaction vessel; stirring the materials for 26 min-34 min to achieve the base resin; and
3) adding the chlorophosphate, propyl formate or a mixture of a propyl formate and a methyl propionate, polyol, 1 to 3 parts by weight of a surfactant, 2 to 6 parts by weight of a catalyst, 0 to 0.5 parts by weight of water and 0 to 1 parts by weight of a colorant materials for preparing the hardener into a reaction vessel; stirring the materials for 26 min-34 min to achieve the hardener.

The present invention adds large amount of high-density compositions which is chlorophosphate mixture with a density over 1400 kg/m$^3$. The rapid flowing material forms a mixture with the water at the outlet of the grouting machine when the materials is injected into the water leaking out of the burst pipe by a high-pressure grouting machine. The density of the mixture of the water and materials is higher than the water. The material rapidly sediments at the bottom of the water and merges to form a continuous phase before evenly swelling and consolidation. The density of the polymer formed in the process is high, which is higher than 100 kg/m$^3$. The compression strength of the polymer is higher than 0.8 mpa. The material is fire-resistant due to the added chlorophosphate in the mixture. The fire-resistant rating is C under Chinese national standard GB8624.

The consolidating time of the rapid-hardening underground pipeline grouting repair polymer is no more than 10 s. The rapid hardening process reduce the impact of the water on the material molding. The pipes is able to be used immediately after the repairing. The isocyanate in the material reacts with the water and polyol, which releases large amounts of heat. The density of the polymer formed after consolidation is high. The consolidation process is rapid and the consolidation time is no more than 10 s. Large amount of materials are grouted to repair the pipes. The above listed processes cause the temperature within the material easily over 200° C. which causes core-yellowing of the polymer foam. The compressive strength of the core-yellowing polymer foam is much less than 0.8 mpa. The present invention replaces conventional physical foaming agent with low boiling point of 20-50° C. with a physical foaming agent of propyl formate, a methyl propionate or a mixture of a propyl formate and a methyl propionate with high boiling point of 80° C. The physical foaming agent with high boiling point performs well during reaction of the material. When the temperature within the material is over 80° C. the physical foaming agent turns into gas which assists the foaming and most importantly absorbs the heat produced during the phase change between the liquid and the gas. The core-yellowing problem is thus solved. The loss of compression strength is prevented.

The propyl formate, a methyl propionate or a mixture of a propyl formate and a methyl propionate in the rapid-hardening underground pipeline grouting repair polymer are able to be replaced by alkane, liquid of ester or mixture of alkane and liquid of ester which meets the following requirements: boiling point 80-90° C.; no hydroxyl; no reaction with the isocyanate; compatible with other composition in the hardening agent; no layers after still settlement.

The base resin and hardener of the present invention meets the following indications while grouting the burst pipes: consolidation time is no more than 10 s; the physical properties of the polymer is as follow: no core-yellowing after hardening; the density of the polymer is higher than 100 kg/m$^3$; the compression strength is not lower than 0.8 mpa; fire-resistant rating is C; the contents of heavy metals such as arsenic, cadmium, hexavalent chromium, lead, mercury and selenium after the hardening reaction of the rapid-hardening underground pipeline grouting repair polymer meets the requirements in Chinese national standard GB/T 17219-1998.

The chlorohydrin alkyl phosphate mixture adopted by the present invention is WS1-R-A300TB produced by Zhejiang Wansheng Co., Ltd. The density of the WSW-A300TB is 1.48±0.005 g/cm$^3$ (25° C.).

DETAILED DESCRIPTION OF THE PREFERRED EMBODIMENT

Embodiment 1

The rapid-hardening underground pipeline grouting repair polymer comprises a base resin and a hardener, the weight ratio of which is 2:1-1:1; wherein
the base resin comprises 50 to 160 parts by weight of an isocyanate; 20 to 100 parts by weight of a chlorophosphate mixture with a density over 1400 kg/m$^3$; a parts by weight ratio of the isocyanate and chlorophosphate is 1:1-4:1;
the hardener comprises 30 to 60 parts by weight of a chlorophosphate mixture with a density over 1400 kg/m$^3$, 5 to 15 parts by weight of a propyl formate, a methyl propionate or a mixture of a propyl formate and a methyl propionate, 15 to 55 parts by weight of a polyol, 1 to 3 parts by weight of a surfactant, 2 to 6 parts by weight of a catalyst, 0 to 0.5 parts by weight of water and 0 to 1 parts by weight of a colorant.

The catalyst is selected from the group consisting of a catalyst PT303, a catalyst PT304 and a catalyst PT306.

The surfactant is an agent for stabilizing the foaming, realizing compact and uniform foam pore arrangement, unbroken foam pores. The surfactant is selected from the group consisting of a LK221, a LK443 or a LK665; wherein LK221 is a polyurethane cell stabilizer surfactant supplied which is a liquid polymer-polyol product comprising the copolymer of N-vinyl pyrrolidone and dibutyl maleate polymerized in a trifunctional polyol; LK443 is a unique organic surfactant for use in rigid polyurethane applications to provide a smooth surface; LK665 is a non-silicone surfactant.

A method of preparing the rapid-hardening underground pipeline grouting repair polymer comprises steps of:
1) weighing materials for preparing the base resin and the hardener according to the parts of weight
2) adding the materials for preparing the base resin into a reaction vessel;
stirring the materials for 26 min-34 min to achieve the base resin; and
3) adding the materials for preparing the hardener into a reaction vessel;
stirring the materials for 26 min-34 min to achieve the hardener.

To store the base resin and the hardener separately for longer retention time when no need for mixture.

Embodiment 2

The rapid-hardening underground pipeline grouting repair polymer comprises a base resin and a hardener, the weight ratio of which is 2:1-1:1; wherein the base resin comprises 50 to 160 parts by weight of an isocyanate; 20 to 100 parts by weight of a chlorophosphate mixture with a density over 1400 kg/m³; a parts by weight ratio of the isocyanate and chlorophosphate is 1:1-4:1;

the hardener comprises 30 to 60 parts by weight of a chlorophosphate mixture with a density over 1400 kg/m³, 5 to 15 parts by weight of a propyl formate, a methyl propionate or a mixture of a propyl formate and a methyl propionate, 15 to 55 parts by weight of a polyol, 1 to 3 parts by weight of a surfactant, 2 to 6 parts by weight of a catalyst, 0 to 0.5 parts by weight of water and 0 to 1 parts by weight of a colorant.

The catalyst is selected from the group consisting of a catalyst PT303, a catalyst PT304 and a catalyst PT306. The surfactant is a non-silicone surfactant.

The method of preparing the rapid-hardening underground pipeline grouting repair polymer, comprises steps:

1) weighing materials for preparing the base resin and the hardener according to the parts of weight 2) adding the materials for preparing the base resin into a reaction vessel; stirring the materials for 26 min-34 min to achieve the base resin; and 3) adding the materials for preparing the hardener into a reaction vessel;

stirring the materials for 26 min-34 min to achieve the hardener.

Embodiment 3

The rapid-hardening underground pipeline grouting repair polymer comprises a base resin and a hardener, the composition of which is measured by parts of weight. The weight of compositions by parts of the base resin is listed in the following chart 1-1:

CHART 1-1 weight of compositions by parts of the base resin

| Type | Brand and manufacturer | Parts of weight |
|---|---|---|
| PAPI (polyaryl polymethylene isocyanates) | WANNATE 2208 (Wanhua Chemical Group Co., Ltd.) | 80 |
| Modified isocyanate | WANNATE 8211 (Wanhua Chemical Group Co., Ltd.) | 60 |
| chlorophosphate mixture | WSFR-A300TB (Zhejiang Wansheng Co., Ltd.) | 60 |
| Total | | 200 |

The weight by parts of the compositions of hardener is listed in the following chart 1-2:

CHART 1-2 weight by parts of the compositions of hardener

| Type | Brand and manufacturer | Parts of weight |
|---|---|---|
| chlorophosphate mixture | WSFR-A300TB (Zhejiang Wansheng Co., Ltd.) | 40 |
| propyl formate | propyl formate (Chemically pure) | 5 |
| propyl formate | methyl propionate (Chemically pure) | 3 |
| polyester polyol | PS3152 (Nanjing Stepan Jinling Chemical Co., Ltd.) | 32 |
| polyether polyol | R2304 (Wanhua Chemical (Ningbo) Rongwei Polyurethane Co., Ltd.) | 16 |
| surfactant | LK221 (Evonik Industries AG) | 1 |
| catalyst | PT303 (Evonik Industries AG) | 0.4 |
| catalyst | PT304 (Evonik Industries AG) | 0.8 |
| catalyst | PT306 (Evonik Industries AG) | 1.5 |
| water | Distilled water or public water supply | 0.05 |
| colorant | 036-2M1941 (BOMEX Chemical (Shanghai) Co., Ltd.) | 0.25 |
| total | | 100 |

The method of preparing the rapid-hardening underground pipeline grouting repair polymer, comprises steps of:

1) weighing materials for preparing the base resin and the hardener according to the parts of weight 2) adding the isocyanate and chlorophosphate for preparing the base resin into a reaction vessel; stirring the materials for 26 min to achieve the base resin; and 3) adding the materials for preparing the hardener into a reaction vessel; stirring the materials for 26 min to achieve the hardener.

Mixing the prepared base resin and the hardener of the rapid-hardening underground pipeline grouting repair polymer to grout pipe by the high-pressure grouting machine produced by Zhengzhou Dannate Inspection & Testing Technology Co., Ltd. The color of the slurry after consolidation is grey. The physical features of the slurry are listed in the following chart 1-3:

CHART 1-3

| Physical feature | | Unit | Test result | Test standard |
|---|---|---|---|---|
| Consolidation time | | s | 9.5 | Measure by eyes |
| Appearance | | — | Evenly distributed grey | Measure by eyes |
| Density | | Kg/m³ | 137 | GB/T 6343-2009 |
| Compression strength | | mPa | 1.2 | GB/T 8813-2008 |
| Fire-resistant rating | | — | C | GB8624-2016 |
| Water Left after consolidation | arsenic | mg/L | ND | GB/T 17219-1998 |
| | cadmium | | ND | |
| | copper | | ND | |
| | lead | | ND | |
| | mercury | | 0.00023 | |
| | Hexavalent chromium | | ND | |

Embodiment 4

The rapid-hardening underground pipeline grouting repair polymer comprises a base resin and a hardener, the composition of which is measured by parts of weight. The weight of compositions by parts of the base resin is listed in the following chart 2-1:

CHART 2-1 weight of compositions by parts of the base resin

| Type | Brand and manufacturer | Parts of weight |
|---|---|---|
| PAPI (polyaryl polymethylene isocyanates) | WANNATE 2208 (Wanhua Chemical Group Co., Ltd.) | 105 |
| isocyanate | MDI 100LL (Wanhua Chemical Group Co., Ltd.) | 15 |
| chlorophosphate mixture | WSFR-A300TB (Zhejiang Wansheng Co., Ltd.) | 30 |
| Total | | 150 |

The weight by parts of the compositions of hardener is listed in the following chart 2-2:

CHART 2-2 weight by parts of the compositions of hardener

| Type | Brand and manufacturer | Parts of weight |
|---|---|---|
| chlorophosphate mixture | WSFR-A300TB (Zhejiang Wansheng Co., Ltd.) | 30 |
| propyl formate | propyl formate (Chemically pure) | 5 |
| polyester polyol | PS3152 (Nanjing Stepan Jinling Chemical Co., Ltd.) | 18 |
| polyether polyol | R2304 (Wanhua Chemical (Ningbo) Rongwei Polyurethane Co., Ltd.) | 38.4 |
| surfactant | LK443 (Evonik Industries AG) | 3 |
| catalyst | PT303 (Evonik Industries AG) | 0.9 |
| catalyst | PT304 (Evonik Industries AG) | 1.4 |
| catalyst | PT306 (Evonik Industries AG) | 2.7 |
| water | Distilled water or public water supply | 0 |
| colorant | 036-2M1941(BOMEX Chemical (Shanghai) Co., Ltd.) | 0.6 |
| total | | 100 |

The method of preparing the rapid-hardening underground pipeline grouting repair polymer, comprises steps of:

1) weighing materials for preparing the base resin and the hardener according to the parts of weight
2) adding the materials for preparing the base resin into a reaction vessel; stirring the materials for 34 min to achieve the base resin; and
3) adding the materials for preparing the hardener into a reaction vessel; stirring the materials for 34 min to achieve the hardener.

Mixing the prepared base resin and the hardener of the rapid-hardening underground pipeline grouting repair polymer to grout pipe by the high-pressure grouting machine produced by Zhengzhou Dannate Inspection & Testing Techonology Co., Ltd. The color of the slurry after consolidation is grey. The physical features of the slurry are listed in the following chart 2-3:

CHART 2-3

| Physical feature | | Unit | Test result | Test standard |
|---|---|---|---|---|
| Consolidation time | | s | 9.0 | Measure by eyes |
| Appearance | | — | Evenly distributed grey | Measure by eyes |
| Density | | Kg/m$^3$ | 124 | GB/T 6343-2009 |
| Compression strength | | mPa | 1.0 | GB/T 8813-2008 |
| Fire-resistant rating | | — | C | GB8624-2016 |
| Water Left after consolidation | arsenic | mg/L | ND | GB/T 17219-1998 |
| | cadmium | | ND | |
| | copper | | ND | |
| | lead | | ND | |
| | mercury | | 0.00022 | |
| | Hexavalent chromium | | ND | |

Embodiment 5

The rapid-hardening underground pipeline grouting repair polymer comprises a base resin and a hardener, the composition of which is measured by parts of weight. The weight of compositions by parts of the base resin is listed in the following chart 3-1:

CHART 3-1 weight of compositions by parts of the base resin

| Type | Brand and manufacturer | Parts of weight |
|---|---|---|
| PAPI (polyaryl polymethylene isocyanates) | WANNATE 2208 (Wanhua Chemical Group Co., Ltd.) | 70 |
| chlorophosphate mixture | WSFR-A300TB (Zhejiang Wansheng Co., Ltd.) | 30 |
| Total | | 100 |

The weight by parts of the compositions of hardener is listed in the following chart 2-2:

CHART 3-2 weight by parts of the compositions of hardener

| Type | Brand and manufacturer | Parts of weight |
|---|---|---|
| chlorophosphate mixture | WSFR-A300TB (Zhejiang Wansheng Co., Ltd.) | 35 |
| propyl formate | propyl formate (Chemically pure) | 5 |
| polyester polyol | PS3152 (Nanjing Stepan Jinling Chemical Co., Ltd.) | 5 |
| polyether polyol | R2304 (Wanhua Chemical (Ningbo) Rongwei Polyurethane Co., Ltd.) | 43 |
| surfactant | LK665 (Evonik Industries AG) | 2 |
| catalyst | PT303 (Evonik Industries AG) | 0.8 |
| catalyst | PT304 (Evonik Industries AG) | 1.2 |
| catalyst | PT306 (Evonik Industries AG) | 2 |
| water | Distilled water or public water supply | 0 |
| colorant | 036-2M1941(BOMEX Chemical (Shanghai) Co., Ltd.) | 1 |
| total | | 100 |

The method of preparing the rapid-hardening underground pipeline grouting repair polymer, comprises steps of:
1) weighing materials for preparing the base resin and the hardener according to the parts of weight 2) adding the materials for preparing the base resin into a reaction vessel; stirring the materials for 30 min to achieve the base resin; and
3) adding the materials for preparing the hardener into a reaction vessel;
stirring the materials for 30 min to achieve the hardener.

Mixing the prepared base resin and the hardener of the rapid-hardening underground pipeline grouting repair polymer to grout pipe by the high-pressure grouting machine produced by Zhengzhou Dannate Inspection & Testing Techonology Co., Ltd. The color of the slurry after consolidation is grey. The physical features of the slurry are listed in the following chart 3-3:

CHART 3-3

| Physical feature | | Unit | Test result | Test standard |
|---|---|---|---|---|
| Consolidation time | | s | 8.5 | Measure by eyes |
| Appearance | | — | Evenly distributed grey | Measure by eyes |
| Density | | Kg/m³ | 106 | GB/T 6343-2009 |
| Compression strength | | mPa | 0.9 | GB/T 8813-2008 |
| Fire-resistant rating | | — | C | GB8624-2016 |
| Water Left after consolidation | arsenic | mg/L | ND | GB/T 17219-1998 |
| | cadmium | | ND | |
| | copper | | ND | |
| | lead | | ND | |
| | mercury | | 0.00022 | |
| | Hexavalent chromium | | ND | |

The parts by weight ratio of the rapid-hardening underground pipeline grouting repair polymer is also as described by the below embodiments.

Embodiment 6

The rapid-hardening underground pipeline grouting repair polymer comprises the base resin and the hardener; wherein the base resin comprises 50 parts by weight of an isocyanate; 50 parts by weight of the chlorophosphate mixture with a density over 1400 kg/m³;
the hardener comprises 30 parts by weight of the chlorophosphate mixture with a density over 1400 kg/m³, 7 parts by weight of the propyl formate, 15 parts by weight of the polyol, 1 parts by weight of the surfactant, 2 parts by weight of the catalyst;
the isocyanate is the MDI(Methylenediphenyl Diisocyanate); the polyol is a sucrose polyether polyol; the catalyst comprises PT303 0.4 parts, PT304 0.6 parts and PT306 1 parts;
the surfactant comprises LK221 0.2 parts, LK443 0.4 parts and LK665 0.4 parts The method for preparing the rapid-hardening underground pipeline grouting repair polymer is described in the embodiment 1, which is mixing the material for preparing the base resin to achieve the base resin and mixing the material for preparing hardener to achieve the hardener.

Embodiment 7

The rapid-hardening underground pipeline grouting repair polymer comprises the base resin and the hardener; wherein the base resin comprises 160 parts by weight of the isocyanate; 100 parts by weight of the chlorophosphate mixture with a density over 1400 kg/m³;
the hardener comprises 60 parts by weight of a chlorophosphate mixture with a density over 1400 kg/m³, 15 parts by weight of the methyl propionate, 55 parts by weight of the polyol, 3 parts by weight of the surfactant, 6 parts by weight of the catalyst, 0.5 parts of water and 1 part of colorant;
the isocyanate is the TDI (Toluene diisocyanate); the polyol is the sorbitol polyether polyol; the catalyst comprises PT303 1.3 parts, PT304 2.0 parts and PT306 2.7 parts;
the surfactant comprises LK221 2 parts, LK443 1 part.

The method for preparing the rapid-hardening underground pipeline grouting repair polymer is described in the embodiment 1, which is mixing the material for preparing the base resin to achieve the base resin and mixing the material for preparing hardener to achieve the hardener.

Embodiment 8

The rapid-hardening underground pipeline grouting repair polymer comprises the base resin and the hardener; wherein the base resin comprises 50 parts by weight of an isocyanate; 20 parts by weight of the chlorophosphate mixture with a density over 1400 kg/m³;
the hardener comprises 30 parts by weight of the chlorophosphate mixture with a density over 1400 kg/m³, 3 parts by weight of the propyl formate, 2 parts by weight of the methyl propionate, 15 parts by weight of the polyol, 1 parts by weight of the surfactant, 2 parts by weight of the catalyst and 0.5 parts by weight of water;
the isocyanate comprises 20 parts by weight of PAPI and 30 parts by weight of MDI; the polyol comprises 2 parts by weight of the phthalic anhydride polyester polyol and 13 parts by weight of the adipic acid polyester polyol;
the catalyst comprises PT303 0.4 parts, PT304 0.6 parts and PT306 1 parts;
the surfactant comprises LK443 0.8 parts, LK665 0.2 parts The method for preparing the rapid-hardening underground pipeline grouting repair polymer is described in the embodiment 1, which is mixing the material for preparing the base resin to achieve the base resin and mixing the material for preparing hardener to achieve the hardener.

Embodiment 9

The rapid-hardening underground pipeline grouting repair polymer comprises a base resin and a hardener; wherein the base resin comprises 80 parts by weight of the isocyanate; 20 parts by weight of the chlorophosphate mixture with a density over 1400 kg/m³;
the hardener comprises 50 parts by weight of a chlorophosphate mixture with a density over 1400 kg/m³, 3 parts by weight of a propyl formate, 3 parts by weight of methyl propionate, 35 parts by weight of a polyol, 3 parts by weight of the surfactant, 3 parts by weight of the catalyst, 0.2 parts by weight of water and 0.5 parts by weight of colorant;
the isocyanate comprises 100 parts by weight of MDI and 60 parts by weight of TDI; the polyol is an adipic acid polyester polyol;
the catalyst comprises PT303 0.5 parts, PT304 0.9 parts and PT306 1.6 parts;
the surfactant comprises LK221 0.9 parts, LK443 2.1 parts The method for preparing the rapid-hardening underground pipeline grouting repair polymer is described in the embodiment 1, which is mixing the material for preparing the base resin to achieve the base resin and mixing the material for preparing hardener to achieve the hardener.

Embodiment 10

The rapid-hardening underground pipeline grouting repair polymer comprises the base resin and the hardener; wherein the base resin comprises 60 parts by weight of the isocyanate; 20 parts by weight of the chlorophosphate mixture with a density over 1400 kg/m$^3$;

the hardener comprises 40 parts by weight of the chlorophosphate mixture with a density over 1400 kg/m$^3$, 5 parts by weight of the propyl formate, 2 parts by weight of methyl propionate, 20 parts by weight of the polyol, 1 part by weight of the surfactant, 5 parts by weight of the catalyst, 0.5 parts by weight of water and 1 part by weight of the colorant;

the isocyanate comprises 20 parts by weight of MDI and 40 parts by weight of modified TDI;

the polyol comprises 5 parts by weight of sucrose polyether polyol, 6 parts by weight of the sorbitol polyether polyol, 3 parts by weight of the phthalic anhydride based polyester polyol and 6 parts by weight of an adipic acid polyester polyol;

the catalyst comprises PT303 0.7 parts, PT304 1.6 parts and PT306 2.7 parts;

the surfactant comprises LK221 0.5 parts, LK665 0.5 parts

The method for preparing the rapid-hardening underground pipeline grouting repair polymer is described in the embodiment 1, which is mixing the material for preparing the base resin to achieve the base resin and mixing the material for preparing hardener to achieve the hardener.

Embodiment 11

The rapid-hardening underground pipeline grouting repair polymer comprises a base resin and a hardener; wherein the base resin comprises 120 parts by weight of the isocyanate; 60 parts by weight of the chlorophosphate mixture with a density over 1400 kg/m$^3$;

the hardener comprises 45 parts by weight of the chlorophosphate mixture with a density over 1400 kg/m$^3$, 5 parts by weight of a propyl formate, 6 parts by weight of methyl propionate, 30 parts by weight of a polyol, 1.5 parts by weight of a surfactant, 4.5 parts by weight of a catalyst, 0.5 parts by weight of water and 0.5 parts by weight of colorant;

the isocyanate is modified TDI; the polyol comprises 20 parts by weight of the sorbitol polyether polyol and 10 parts by weight of a phthalic anhydride based polyester ro polyol;

the catalyst comprises PT303 0.9 parts, PT304 1.4 parts and PT306 2.2 parts;

the surfactant is LK221.

The method for preparing the rapid-hardening underground pipeline grouting repair polymer is described in the embodiment 1, which is mixing the material for preparing the base resin to achieve the base resin and mixing the material for preparing hardener to achieve the hardener.

Embodiment 12

The rapid-hardening underground pipeline grouting repair polymer comprises a base resin and a hardener; wherein the base resin comprises 60 parts by weight of the isocyanate; 40 parts by weight of the chlorophosphate mixture with a density over 1400 kg/m$^3$;

the hardener comprises 60 parts by weight of the chlorophosphate mixture with a density over 1400 kg/m$^3$, 6 parts by weight of methyl propionate, 18 parts by weight of a polyol, 1 part by weight of a surfactant, 5 parts by weight of a catalyst, 0.4 parts by weight of water and 0.6 parts by weight of colorant;

the isocyanate is modified PAPI; the polyol comprises 6 parts by weight of the polyether polyol prepared by small molecular alcohol and 12 parts by weight of the amine initiated polyether polyol;

the catalyst comprises PT303 0.9 parts, PT304 1.6 parts and PT306 2.5 parts;

the surfactant is LK443.

The method for preparing the rapid-hardening underground pipeline grouting repair polymer is described in the embodiment 1, which is mixing the material for preparing the base resin to achieve the base resin and mixing the material for preparing hardener to achieve the hardener.

Embodiment 13

The rapid-hardening underground pipeline grouting repair polymer comprises a base resin and a hardener; wherein the base resin comprises 75 parts by weight of the isocyanate; 45 parts by weight of the chlorophosphate mixture with a density over 1400 kg/m$^3$;

the hardener comprises 35 parts by weight of the chlorophosphate mixture with a density over 1400 kg/m$^3$, 4 parts by weight of propyl formate, 5 parts by weight of methyl propionate, 18 parts by weight of a polyol, 1.2 parts by weight of a surfactant, 2.5 parts by weight of a catalyst, 0.1 parts by weight of water and 0.3 parts by weight of colorant;

the isocyanate is modified TDI; the polyol is the sucrose polyether polyol;

the catalyst comprises PT303 0.5 parts, PT304 0.8 parts and PT306 1.2 parts;

the surfactant comprises LK221 0.8 parts and LK443 0.4 parts.

The method for preparing the rapid-hardening underground pipeline grouting repair polymer is described in the embodiment 1, which is mixing the material for preparing the base resin to achieve the base resin and mixing the material for preparing hardener to achieve the hardener.

Embodiment 14

The rapid-hardening underground pipeline grouting repair polymer comprises a base resin and a hardener; wherein the base resin comprises 150 parts by weight of the isocyanate; 38 parts by weight of the chlorophosphate mixture with a density over 1400 kg/m$^3$;

the hardener comprises 60 parts by weight of the chlorophosphate mixture with a density over 1400 kg/m$^3$, 9 parts by weight of propyl formate, 50 parts by weight of a polyol, 2 parts by weight of a surfactant, 4 parts by weight of a catalyst, 0.3 parts by weight of water and 0.8 parts by weight of colorant;

the isocyanate comprises 20 parts by weight of MDI, 30 parts by weight of the TDI, 40 parts by weight of modified MDI and 60 parts by weight of modified TDI;

the polyol comprises 30 parts by weight of the sucrose polyether polyol, 10 parts by weight of the sorbitol polyether polyol and 10 parts by weight of phthalic anhydride based polyester polyol;

the catalyst comprises PT303 0.8 parts, PT304 1.2 parts and PT306 2 parts;

the surfactant comprises LK221 1 part, LK443 0.5 parts and LK665 0.5 parts.

The method for preparing the rapid-hardening underground pipeline grouting repair polymer is described in the embodiment 1, which is mixing the material for preparing the base resin to achieve the base resin and mixing the material for preparing hardener to achieve the hardener.

Embodiment 15

The rapid-hardening underground pipeline grouting repair polymer comprises a base resin and a hardener; wherein the base resin comprises 120 parts by weight of the isocyanate; 70 parts by weight of the chlorophosphate mixture with a density over 1400 kg/m³;

the hardener comprises 50 parts by weight of the chlorophosphate mixture with a density over 1400 kg/m³, 6 parts by weight of propyl formate, 3 parts by weight of methyl propionate, 45 parts by weight of a polyol, 2 parts by weight of a surfactant, 3 parts by weight of a catalyst, 0.3 parts by weight of water and 0.2 parts by weight of colorant;

the isocyanate comprises 30 parts by weight of PAPI, 30 parts by weight of the MDI, 30 parts by weight of TDI, 10 parts by weight of modified MDI and 20 parts by weight of modified TDI;

the polyol comprises 10 parts by weight of the sucrose polyether polyol and 30 parts by weight of the sorbitol polyether polyol;

the catalyst comprises PT303 0.6 parts, PT304 1.0 parts and PT306 1.4 parts;

the surfactant comprises LK221 1 part and LK665 1 part.

The method for preparing the rapid-hardening underground pipeline grouting repair polymer is described in the embodiment 1, which is mixing the material for preparing the base resin to achieve the base resin and mixing the material for preparing hardener to achieve the hardener.

Embodiment 16

The rapid-hardening underground pipeline grouting repair polymer comprises a base resin and a hardener; wherein the base resin comprises 80 parts by weight of the isocyanate; 70 parts by weight of the chlorophosphate mixture with a density over 1400 kg/m³;

the hardener comprises 45 parts by weight of the chlorophosphate mixture with a density over 1400 kg/m³, 6 parts by weight of propyl formate, 4 parts by weight of methyl propionate, 29 parts by weight of a polyol, 1.2 parts by weight of a non-silicone surfactant, 3.5 parts by weight of a catalyst, 0.4 parts by weight of water and 0.6 parts by weight of colorant;

the isocyanate comprises 60 parts by weight of TDI and 20 parts by weight of the modified TDI;

the polyol comprises 15 parts by weight of the phthalic anhydride based polyester polyol and 14 parts by weight of adipic acid polyester polyol;

the catalyst comprises PT303 0.6 parts, PT304 1.1 parts and PT306 1.8 parts.

The method for preparing the rapid-hardening underground pipeline grouting repair polymer is described in the embodiment 1, which is mixing the material for preparing the base resin to achieve the base resin and mixing the material for preparing hardener to achieve the hardener.

The above mentioned embodiments are exemplary and just for better illustrating the present invention, which are not a limit. The skilled in the art is able to modify and improve the present invention without departure from the structural principles of the present invention. These modifications and improvements are within the protection range of the present invention.

What is claimed is:

1. A rapid-hardening underground pipeline grouting repair polymer, comprising: a base resin and a hardener, a weight ratio of which is 2:1-1:1; wherein
    the base resin comprises 50 to 160 parts by weight of an isocyanate; 20 to 100 parts by weight of a chlorinated phosphate ester mixture with a density over 1400 kg/m³; a ratio of parts by weight of the isocyanate and the chlorinated phosphate ester is 1:1-4:1;
    the hardener comprises 30 to 60 parts by weight of the chlorinated phosphate ester mixture with a density over 1400 kg/m³, 5 to 15 parts by weight of a propyl formate, a methyl propionate or a mixture of the propyl formate and the methyl propionate, 15 to 55 parts by weight of a polyol, 1 to 3 parts by weight of a surfactant, 2 to 6 parts by weight of a catalyst, 0 to 0.5 parts by weight of water and 0 to 1 parts by weight of a colorant.

2. The rapid-hardening underground pipeline grouting repair polymer, as recited in claim 1, wherein the surfactant is a non-silicone surfactant.

3. The rapid-hardening underground pipeline grouting repair polymer, as recited in claim 1, wherein the surfactant is selected from the group consisting of a surfactant A, a surfactant B and a surfactant C; wherein the surfactant A is a polyurethane cell stabilizer surfactant which is a liquid polymer-polyol product comprising a copolymer of N-vinyl pyrrolidone and a dibutyl maleate polymerized in a trifunctional polyol; the surfactant B is a unique organic surfactant for use in rigid polyurethane applications to provide a smooth surface; the surfactant C is a non-silicone surfactant.

4. The rapid-hardening underground pipeline grouting repair polymer, as recited in claim 1, wherein the isocyanate is selected from the group consisting of a PAPI (polyaryl polymethylene isocyanates), a MDI (Methylenediphenyl Diisocyanate), a TDI (Toluene diisocyanate), a modified PAPI, a modified MDI and a modified TDI.

5. The rapid-hardening underground pipeline grouting repair polymer, as recited in claim 1, wherein the polyol is selected from the group consisting of a sucrose polyether polyol, a sorbitol polyether polyol, a polyether polyol prepared by small molecular alcohol, an amine initiated polyether polyol, a phthalic anhydride based polyester polyol and an adipic acid polyether polyol.

* * * * *